United States Patent Office 2,971,002
Patented Feb. 7, 1961

2,971,002

N-ALKOXY QUATERNARY HETEROCYCLIC ALKYL SULFATE SALTS

Wayne E. Feely, Jenkintown, Pa., assignor to Rohm & Haas Company, Philadelphia, Pa., a corporation of Delaware No Drawing. Filed Oct. 8, 1958, Ser. No. 765,927

3 Claims. (Cl. 260—294.8)

This invention concerns a series of N-alkoxy alkyl sulfate derivatives of aromatically unsaturated nitrogen-containing heterocycles in which the nitrogen is a member of a six-membered ring.

More particularly, it concerns a series of N-alkoxy alkyl sulfate derivatives of pyridine, quinoline, isoquinoline and the substituted derivatives thereof, in which the alkyl and alkoxy groups contain from one to eighteen carbon atoms. These aromatically unsaturated nitrogen-containing heterocycles will, for ease of reference hereinafter, be referred to as "nitrogen heterocycles."

The products of this invention are of interest as fungicides and as a source of valuable chemicals by further reaction.

This application is a continuation-in-part of my parent application, Serial No. 759,859, filed September 9, 1958.

N-alkoxy quaternary halide salts of typical aromatically unsaturated nitrogen-containing heterocycles in which the nitrogen is a member of a six-membered ring are known in the prior art. Thus, 1-methoxypyridinium iodide, 1-methoxyquinolinium iodide, and 1-benzyloxypyridinium bromide, as typical examples, are disclosed in the literature. These compounds can be prepared by reacting the corresponding N-oxide with alkyl halides. However, the chlorides are quite unreactive and it is generally necessary to use the bromides or iodides in order to obtain sufficient reactivity. Even with the use of these expensive reagents, yields are generally low and the use of solvents is generally necessary.

It has been found that dialkyl sulfates react readily with the N-oxides of the nitrogen heterocycles hereinafter set forth to produce the corresponding N-alkoxy alkyl sulfate salts of the nitrogen heterocycles in substantially quantitative yield. The lower dialkyl sulfates, such as dimethyl and diethyl sulfates are readily available at low cost and react readily with the N-oxides. However, the higher alkyl sulfates, such as di-n-decyl and di-n-octadecyl sulfates, are also operable and react readily with the N-oxides to give highly crystalline higher melting quaternary salts which are water-soluble, relatively non-hygroscopic, and exhibit high fungicidal activity.

While solvents which are chemically inert under the reaction conditions can be employed, the preferred embodiment employs no solvent.

The N-oxides of the nitrogen heterocycles can be readily prepared by treatment of the heterocyclic compound with hydrogen peroxide as shown in detail hereinafter. The method of preparation of the N-oxides is essentially that set forth by Ochiai (J. Org. Chem. 18, 548 (1953)). The process comprises the stepwise addition of one mole of hydrogen peroxide as a 35% solution to one mole of the nitrogen heterocyclic compound dissolved in glacial acetic acid. The temperature of the reaction mixture is maintained at about 70° to about 90° C. for a period of about six hours. After the removal of the acetic acid by vacuum distillation, water is added and the oxide distilled in vacuo. The preparation of N-oxides as hereinbefore described forms no part of the present invention.

The N-alkoxy quaternary heterocyclic alkyl-sulfate salts are prepared from the oxides by mixing and reacting the dialkyl sulfate with the N-oxide. Although a solvent which is not reactive with either of the reactants under the reaction conditions can be employed, no solvent is required. Nor does the order of addition appear to be critical. Generally speaking, the exothermic heat of reaction is sufficient to drive the reaction essentially to completion and in some cases it is necessary to control the temperature in the range from about 25° to about 150° C., the preferred range being 80° to 120° C., by controlling the rate of addition of the two chemicals. When addition has been completed, the reaction mixture is heated on a waterbath from about 80° C. to about 100° C. for about two hours to insure completion of reaction. Although the ratios of N-oxide and dialkyl sulfate can be varied over wide limits and still be within the scope of this invention, the preferred embodiments of this invention employ a 1:1 molar ratio of N-oxide to dialkyl sulfate.

Suitable nitrogen heterocycles include pyridine, quinoline, isoquinoline and substituted derivatives thereof, it being understood that the substituents are not reactive under the reaction conditions of the present invention. Thus, alkyl substituted nitrogen heterocycles react under essentially the same reaction conditions as the unsubstituted nitrogen heterocycles. The nitrogen heterocycles can be polysubstituted. Thus, the lutidines, i.e. the dimethylpyridines, can be used as set forth hereinafter. Similarly, other polyalkyl nitrogen heterocycles can be employed. Cyano substituted nitrogen heterocycles may also be employed. Carbalkoxy substituted nitrogen heterocycles in which the alkoxy group contains one to four carbon atoms may also be used. Combinations of these substituents on one molecule are also useful compounds. Thus, for example, a cyanocarbalkoxy substituted nitrogen heterocycle can be employed.

Suitable compounds include pyridine, 3-methylpyridine, 4-methylpyridine, 2-methylpyridine, 2,6-dimethylpyridine, 2,4-dimethylpyridine, 5-ethyl-2-methylpyridine, 2-cyanopyridine, 3-cyanopyridine, 4-cyanopyridine, 2-cyano-6-methylpyridine, quinoline, 2-methylquinoline, 4-methylquinoline, 2-cyanoquinoline, 4-cyanoquinoline, isoquinoline, ethyl nicotinate, ethyl-6-methylnicotinate, 6-methylnicotinonitrile, 6-methylnicotinamide, ethyl isonicotinate, 3-carbethoxy-2,4-dimethylpyridine, bipyridyl, 2,3-dicarbethoxypyridine, 2,3-dicarbmethoxypyridine, 2-benzylpyridine, 3,4-dicarbethoxypyridine, 2,3,4-trimethylpyridine, 4-carbethoxyquinoline, 1-methylisoquinoline, and 3-methylisoquinoline.

The N-alkoxy quaternary heterocyclic alkyl-sulfate salts are of value for the preparation of cyano substituted heterocyclic compounds as set forth in my copending application, Serial No. 759,859, filed September 9, 1958.

In connection with the use of the N-alkoxypyridinium alkyl sulfates of the present invention, in the cyanation reaction of my copending application, Serial No. 759,859, it is a preferred embodiment that the 4-position in the ring be unsubstituted so that 4-cyanopyridines can be obtained. Many of the pharmaceuticals derivable from the cyanopyridines and substituted cyanopyridines must originally have the cyano group at the 4-position. One example of the many which exist is isonicotinic acid hydrazide, commonly called isoniazid, particularly valuable in the treatment of tuberculosis. This can be derived from 4-cyanopyridine by hydrolysis to the corresponding acid followed by treatment with hydrazine and pyrolysis of the hydrazide salt to produce the desired hydrazide.

4-cyanopyridine N-oxide is also of interest as an ultraviolet stabilizer in a variety of materials, including plastics, and is also of value as an ultraviolet adsorber for the prevention of sunburn.

Representative compounds of the present invention were tested to determine their fungicidal activities. The results of the tests are set forth in Table I. The test method employed is a commonly used test for determining fungitoxicity and the details are set forth in Phytopathology 33, 627–632 (1943). Typical fungi commonly employed to determine fungicidal activity are *Stemphylium sarcinaeforme* (S.s.) and *Monilinia fructicola* (M.f.) and these two fungi were used to obtain the data set forth in Table I. Data are expressed as the $LD_{50}$ in parts per million (p.p.m.) which is the dosage at which germination of the spores is 50% inhibited. The dilute solutions for this test were prepared by dissolving one gram of the compounds in 90 cc. of water to make 1% solutions. These 1% solutions were then further diluted with water to form the 0.1% solutions employed in the test. A spore suspension of *Monilinia fructicola* (M.f.) or *Stemphylium sarcinaeforme* (S.s.) in an amount of 0.5 cc. was added to 2.0 cc. of each of the 0.1% solutions and four drops of each of the resulting suspensions were pipetted onto individual glass slides which had been previously coated with cellulose nitrate. These slides were then placed in large Petri dishes, sealed with water, and held at a constant temperature for 16 to 24 hours at the end of which time the percentage of spores showing no germination was determined. This was done by counting 24 spores in the center of each of the four drops on each slide with the proper correction being made for non-viable spores as determined by the control (untreated) slides in each chamber. The *Stemphylium sarcinaeforme* spore suspensions were standardized to 5000 spores per cc. and the *Monilinia fructicola* suspensions to 10,000 spores per cc. for use in this test. The values shown in Table I indicate satisfactory levels of fungicidal activity.

TABLE I

| Compound | $L.D._{50}$, p.p.m. | |
|---|---|---|
| | S.s. | M.f. |
| 1 | 10–50 | |
| 2 | 10–50 | 50–100 |
| 3 | 10–50 | 100–1,000 |
| 4 | 5 | 5 |

NOTE.—Compound 1 is 1-methoxy-2,4-dimethylpyridinium methyl sulfate. Compound 2 is 1-methoxy-4-methylquinolinium methyl sulfate. Compound 3 is 1-methoxy-2-methylquinolinium methyl sulfate. Compound 4 is 1-decyloxypyridinium decyl sulfate.

PREPARATION OF N-OXIDES

The heterocyclic N-oxides described below were prepared essentially by the method of Ochiai (J. Org. Chem. 18, 548 (1943)). This is by far the most convenient method of preparation and is the method generally employed in the art.

*2,4-lutidine-1-oxide.*—To a solution of 107 grams (1.0 mole) of 2,4-lutidine dissolved in 300 ml. of glacial acetic acid was slowly added 33 grams (0.33 mole) of 35% hydrogen peroxide. The solution was slowly heated to 80° C. on a steam bath. After one hour, another 33 gram-portion of 35% peroxide was added and, finally, after another hour, a third portion of 33 grams (1.0 mole total) of peroxide was added. The temperature was maintained at 80° C. for an additional three hours (6 hours total). The solution was transferred to a distillation apparatus and 200 ml. of acetic acid was removed in vacuo. Two hundred ml. of water was then added and the solution was distilled to 100° C. at 10 mm. pressure. 2,4-lutidine-1-oxide was obtained as an amber oil weighing 132 grams. The oxide was used in subsequent experiments without further purification.

*Quinoline-1-oxide.*—Quinoline-1-oxide was prepared from synthetic quinoline by the method described for 2,4-lutidine-1-oxide using 100 grams of quinoline and 300 ml. of glacial acetic acid. The N-oxide was obtained as a tan oil, which crystallized upon standing overnight in a vacuum desiccator over phosphorus pentoxide. The oxide was used without further purification.

*Isoquinoline-2-oxide.*—Isoquinoline-2-oxide was prepared by the method described above from 100 grams (0.84 mole) of isoquinoline, 85 grams (0.85 mole) of 35% hydrogen peroxide using 300 ml. of glacial acetic acid. After evaporation and drying over phosphorus pentoxide, the N-oxide was obtained as a tan solid and was used without further purification.

The N-oxides of the other nitrogen heterocycles set forth herein were prepared by the same reaction under essentially the same reaction conditions.

The following examples set forth certain well-defined embodiments of the application of this invention. They are not, however, to be considered as limitations thereof, since many modifications may be made without departing from the spirit and scope of this invention.

Unless otherwise specified, all parts are parts by weight.

In the following preparations, all temperatures are centigrade unless otherwise so noted.

Example I

*1-methoxypyridinium methyl-sulfate.*—To 95 grams (1.0 mole) of dry powdered pyridine-1-oxide was slowly added 126 grams (1.0 mole) of dimethyl sulfate at such a rate that the temperature of the reaction mixture was maintained at 80° C. throughout the addition. When the addition was completed (one hour), the solution was heated on a steam bath for two hours. The 1-methoxypyridinium methyl sulfate formed was found to be a brown, hygroscopic oil and was used in subsequent experiments without further purification.

Example II

*1-methoxy-2-methylpyridinium methyl-sulfate.* — This salt was prepared in the same manner as 1-methoxypyridinium methyl sulfate by using 109 grams (1.0 mole) of 2-picoline-1-oxide and 126 grams (1.0 mole) of dimethyl sulfate. Upon cooling, the salt crystallized. Recrystallization from anhydrous acetone gave white crystals, melting 57° to 60° C. Calculated for $C_8H_{13}NO_5S$: Percent C, 40.84; percent H, 5.57; and percent N, 5.96. Found: Percent C, 40.57; percent H, 5.66; and percent N, 5.63.

Example III

*1-methoxy-4-methylpyridinium methyl-sulfate.* — This salt was prepared in the same manner as 1-methoxypyridinium methyl-sulfate by using 109 grams (1.0 mole) of 4-picoline-1-oxide and 126 grams (1.0 mole) of dimethyl sulfate. Upon cooling, the salt crystallized. Recrystallization from anhydrous acetone gave white crystals, melting 69° to 73° C. Calculated for $C_8H_{13}NO_5S$: Percent C, 40.84; percent H, 5.57; and percent N, 5.96. Found: Percent C, 39.84; percent H, 5.52; and percent N, 5.77.

Example IV

*1-methoxy-3-methylpyridinium methyl-sulfate.* — This salt was prepared in the same manner as 1-methoxypyridinium methyl-sulfate by using 109 grams (1.0 mole) of 3-picoline-1-oxide and 126 grams (1.0 mole) of dimethyl sulfate. The salt was found to be a dark reddish brown oil and was used in subsequent experiments without further purification.

Example V

*1-methoxy-2,6-dimethylpyridinium methyl-sulfate.* — This salt was prepared in the same manner as 1-methoxypyridinium methyl-sulfate by using 123 grams (1.0 mole) of 2,6-lutidine-1-oxide and 126 grams (1.0 mole) of dimethyl sulfate. The salt crystallized upon cooling. Recrystallization from anhydrous acetone gave white needles, melting 95° to 97° C. Calculated for $C_9H_{15}NO_5S$: Percent C, 43.36; percent H, 6.07; and percent N, 5.62.

Found: Percent C, 43.14; percent H, 6.20; and percent N, 5.49.

Example VI

*1-methoxy-2,4-dimethylpyridinium methyl-sulfate.*—This salt was prepared by the same method as 1-methoxypyridinium methyl sulfate using 126 grams (1.0 mole) of dimethyl sulfate and 123 grams (1.0 mole) of 2,4-lutidine-1-oxide. The salt was obtained as a brown oil and was used in subsequent experiments without further purification.

Example VII

*1-methoxy-2-methyl-5-ethylpyridinium methyl-sulfate.*—This salt was prepared by the same method as 1-methoxypyridinium methyl sulfate using 69 grams (0.5 mole) of 2-methyl-5-ethylpyridine-1-oxide and 63 grams (0.5 mole) of dimethyl sulfate. The salt was obtained as a brown oil and was used in subsequent experiments without further purification.

Example VIII

*1-methoxyquinolinium methyl-sulfate.*—This salt was prepared in the same manner as 1-methoxypyridinium methyl sulfate by using 72 grams (0.5 mole) of quinoline-1-oxide and 63 grams (0.5 mole) of dimethyl sulfate. Upon cooling, the salt was obtained as a brown oil and was used in subsequent experiments without further purification.

Example IX

*1-methoxy-2-methylquinolinium methyl-sulfate.*—This salt was prepared in the same manner as 1-methoxypyridinium methyl-sulfate by using 80 grams (0.5 mole) of quinaldine-1-oxide and 63 grams (0.5 mole) of dimethyl sulfate. Upon cooling, the salt was obtained as a brown oil and was used in subsequent experiments without further purification.

Example X

*1-methoxy-4-methylquinolinium methyl-sulfate.*—This salt was prepared by the same method as 1-methoxypyridinium methyl sulfate using 80 grams (0.5 mole) of lepidine-1-oxide and 63 grams (0.5 mole) of dimethyl sulfate. Upon cooling the reaction mixture, the salt was obtained as a purple oil, which was used in subsequent experiments without further purification.

Example XI

*2-methoxyisoquinolinium methyl-sulfate.*—This salt was prepared in the same manner as 1-methoxypyridinium methyl-sulfate by using 72 grames (0.5 mole) of isoquinoline-2-oxide and 63 grams (0.5 mole) of dimethyl sulfate. The salt was obtained as a light brown oil and was used in subsequent experiments without further purification.

Example XII

*Preparation of 1-n-decyloxypyridinium decyl-sulfate.*—To 0.95 gram (0.01 mole) of pyridine-1-oxide was added 3.78 grams (0.01 mole) of didecyl sulfate. The mixture was heated at 120° for two hours, and upon cooling the solution crystallized. The salt was recrystallized from acetone giving white plates melting 77° to 80° C. This method gave 4.34 grams of the salt, 92% yield.

The didecyl sulfate was prepared by the method of C. Barkenbus and J. J. Owens, J. Am. Chem. Soc. 56, 1204 (1934). This method gave 63.6% of the sulfate as white plates, after recrystallization from a water-acetone mixture. This mixture showed a melting point of 38° to 39° C. (Reported melting point 37.6° to 37.8° C.) Yield 54%.

Example XIII

A mixture of 60.2 grams (0.1 mole) of dioctadecyl sulfate and 9.5 grams (0.1 mole) of pyridine-1-oxide was heated at 120° C. for 2.5 hours. The melt crystallized on cooling and was recrystallized from acetone.

The dioctadecyl sulfate was prepared using the method of C. Barkenbus and J. J. Owens, J. Am. Chem. Soc. 56, 1204 (1934).

Example XIV

*1-methoxy-4-cyanopyridinium methyl-sulfate.*—To 26 grams (0.25 mole) of 4-cyanopyridinium-1-oxide was slowly added 31.5 grams (0.25 mole) of dimethyl sulfate. When the addition was complete, the solution was heated for three hours on a steam bath. The 1-methyl-4-cyanopyridinium methyl sulfate thus obtained was a thick reddish oil.

Example XV

*1-methoxy-2-methyl-5-carbethoxypyridinium methyl-sulfate.*—To 290 grams (1.6 moles) of ethyl 6-methylnicotinate-1-oxide was slowly added 215 grams (1.7 moles) of dimethyl sulfate. The addition was made at a rate such that the temperature of the reaction mixture was maintained between 90° and 100° C. at first by the exothermic nature of the reaction and then by heating with an oil bath. The addition of dimethyl sulfate was completed in two hours and the temperature was maintained between 90° and 100° for an additional two hours. 1-methoxy-2-methyl-5-carbethoxypyridinium methyl-sulfate was obtained as a brown oil and was used in subsequent experiments without further purification.

The compounds of the present invention may be formulated as fungicidal compositions by a variety of methods well-known to those skilled in the art. Since the compounds are water-soluble, the aqueous solutions of said compounds can be sprayed onto the areas which are fungus-infected or are to be protected against fungal infection. Particularly with the lower alkoxy derivatives, a preferred embodiment incorporates a surfactant to facilitate wetting the surface to be treated and to facilitate spreading on the surface to obtain effective coverage. Thus, there may be used from about 0.5% to about 5% of such agent on the weight of the compounds of the present invention, with 0.8% to 1.2% being the preferred range. Many emulsifying and wetting agents can be used, but care must be taken to avoid the use of anionic wetting agents. Cationic wetting agents are suitable, typical examples of which are stearyl dimethyl benzyl ammonium chloride, diisobutyl phenoxy ethoxy ethyl dimethyl benzyl ammonium chloride, methyldodecylbenzyl trimethyl ammonium chloride, etc. Also suitable are the non-ionic types of surfactants. Typical of this class of surfactants are the alkaryl polyether alcohols, such as those prepared by reacting alkylphenols with ethylene oxide, to give water-soluble products. Other non-ionic surfactants are prepared by the reaction of ethylene oxide with long chain fatty acids, alcohols or mercaptans.

Fungicidal compositions can also be prepared from the compounds of the present invention by formulating for application as dusts or powders. The N-alkoxy alkyl sulfate salts are ground to fine powders and incorporated into inert carriers, typical of which are talc, clay, or diatomaceous earths or any other common inert extender or carrier. The areas to be treated are then dusted with this combination. In another embodiment, the N-alkoxy alkyl sulfate salts are dissolved in water and the aqueous solution is intimately mixed with an inert carrier, such as set forth hereinbefore, the mixture dried, and the resulting cake reground. The areas to be treated are then dusted with this combination.

When the compounds of this invention are applied as sprays, they are used at a concentration of from about 0.5 to about 2.0 pounds per 100 gallons of solvent. As set forth hereinbefore, water is the preferred solvent.

When employed as dusts, they are used at levels of about 2% to about 10% of the total weight of the mixture. Typical inert carriers which are suitable have been set forth hereinbefore.

Typical formulations are as follows:

Aqueous solution:
- 1 pound 1-decycloxypridinium decyl sulfate
- 0.16 oz. stearyl dimenthyl benzyl ammonium chloride For application, 1 pound of the above composition was dissolved in 100 gallons of water.

Dust:
- 5 pounds 1-methoxy-4-methylquinolinium methyl sulfate
- 95 pounds talc
- 0.8 oz. octylphenoxy ethoxy ethanol (containing 7 to 8 ethoxy groups per molecule)

The methyl sulfate salt was dissolved in 10 gallons of water and the octylphenoxy ethoxy ethanol added. This solution was thoroughly admixed with the talc, and the mixture dried and ground to a fine powder.

Similar dusting powders can be prepared by grinding the compounds of the present invention to very fine particle size and incorporating with the desired amount of talc or other inert carrier.

The other compounds of this invention can be similarly formulated as would be apparent to those skilled in the art.

I claim:

1. 1-methoxy-5-carbethoxy-2-methylpyridinium methyl-sulfate.
2. 1-methoxy-4-cyanopyridinium methyl-sulfate.
3. N-alkoxypyridinium N-alkyl sulfate in which the alkoxy and alkyl groups contain the same number of carbon atoms and contain up to 18 carbon atoms.

References Cited in the file of this patent

Meisenheimer: Chem. Abstracts, vol. 7, col. 2207–8 (1913).

Henze: Chem. Abstracts, vol. 31, col. 5799 (1937).

Ochiai: Chem. Abstracts, vol. 45, col. 5154–5 (1951).